May 10, 1949.  G. H. SWEENEY  2,469,614
TIRE CHAIN TONG
Filed Dec. 10, 1945
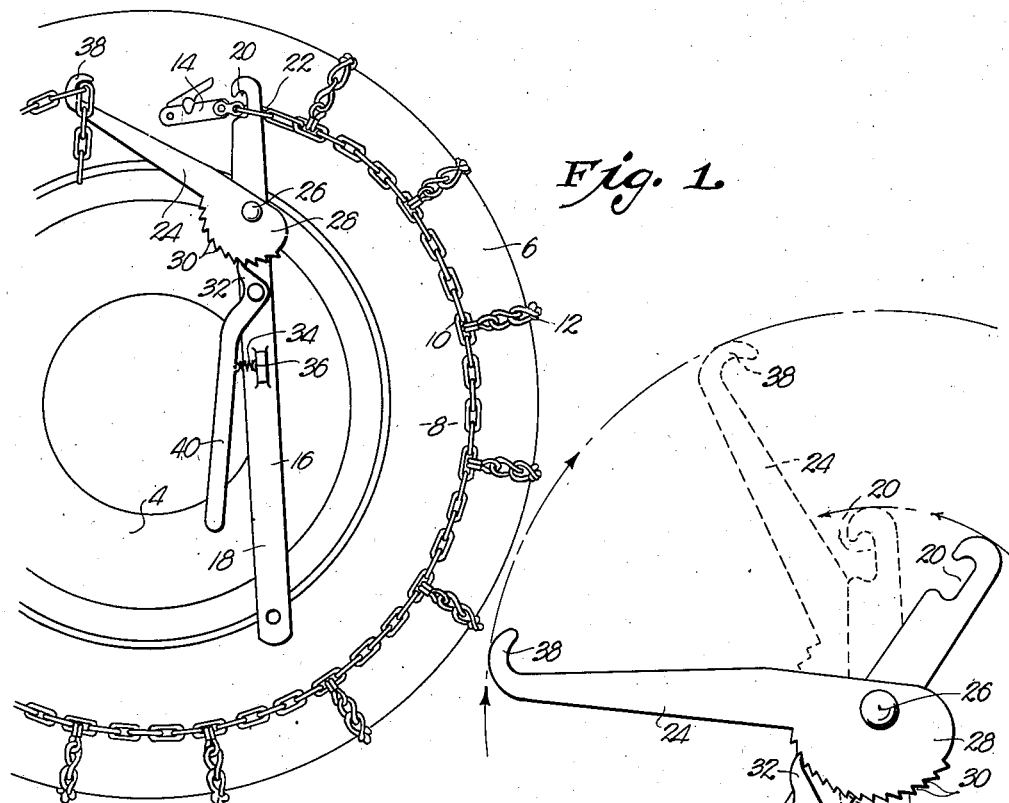
Fig. 1.
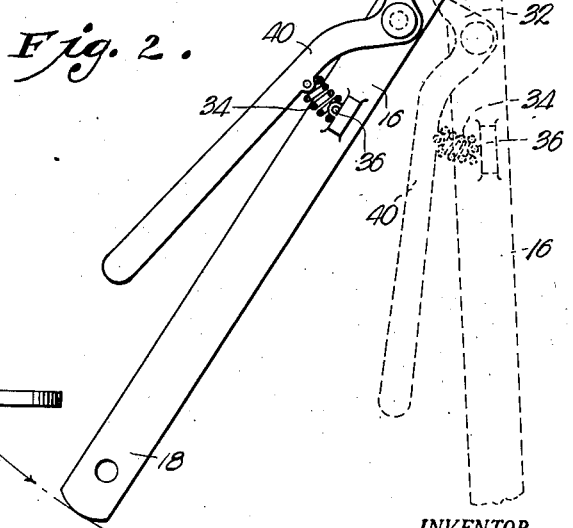
Fig. 2.
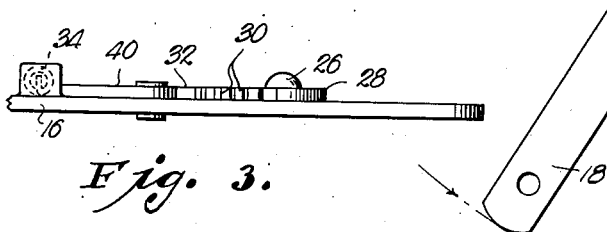
Fig. 3.
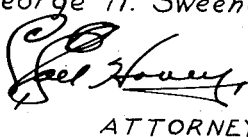
INVENTOR.
George H. Sweeney
BY
ATTORNEY Patented May 10, 1949

2,469,614

UNITED STATES PATENT OFFICE 2,469,614

TIRE CHAIN TONG

George H. Sweeney, Los Angeles, Calif.

Application December 10, 1945, Serial No. 633,936

1 Claim. (Cl. 254—78)

This invention relates to tools, and particularly hand appliances of the character designed for use in applying conventional type tire chains to automobile tires and, therefore, the tool embodying this invention is designated herein as "Tire chain tongs."

One of the important aims of this invention is to provide an appliance in the nature of tire chain tongs which comprises but few parts, is extremely inexpensive to make, yet very efficient in operation.

Tire chains of the ordinary type having cross stretches extending from one side chain to another are difficult to apply, especially when the ends of one of the side chains must be secured together before the ends of the other chain can be fastened together to hold the entire chain assembly in place.

An exceptionally great amount of force is required to pull the ends of the outer side chains together, and usually the person applying the chain cannot, without some mechanical means, draw the ends of either side chains together where the application is satisfactory.

The tire chain tongs embodying this invention, therefore, are peculiarly constructed so that a tremendous amount of force is exerted to draw the ends of the chain together even though the operator is not exerting a great amount of pull on the handle of the appliance.

The tire chain tongs constructed to embody the present invention are simple, both to make and use, and therefore the many objects of the invention will appear during the course of the following specification, referring to the accompany drawing, wherein:

Fig. 1 is a partial side elevation of an automobile wheel with chain associated therewith, showing the tire chain tongs embodying this invention in the operative position.

Fig. 2 is an enlarged, side elevation of the tire chain tongs, and,

Fig. 3 is an edge view of the tongs.

Automobile wheel 4 has pneumatic tire 6 thereon and the conventional tire chain 8 has side chains 10 and cross members 12. One end of side chain 10 has a catch 14 thereon so that one of the links at the other end of chain 10 might be gripped when proper tension is applied.

It is with this well known assembly of parts that the tire chain tongs is used. The tongs per se comprise a main body portion, here shown to be in the nature of a bar 16, one end of which presents a handle portion 18, while the other end is provided with a notch 20 to receive end link 22 of chain 10. This notch 20 should be slightly undercut near the ends thereof to prevent link 22 from slipping therefrom. Bar 16 may be as long as desired, and its length will directly determine the amount of pull which the operator must exert to establish the required force which tends to draw together the ends of chain 10.

A specially formed arm 24 is pivotally secured to bar 16 intermediate the ends of said bar, but closer to the end thereof wherein notch 20 is formed. Pintle 26 serves as the medium for swingably holding arm 24 in place, and an enlarged portion 28, integral with arm 24, presents an edge wherein ratchet teeth 30 are formed. This edge and all of ratchet teeth 30 is concentric with the axis of pintle 26 so that as arm 24 rotates about pintle 26, dog 32 will progressively snap into the teeth 30. This dog 32 is yieldably pressed against ratchet teeth 30 by a spring 34, one end of which is anchored as at 36 to bar 16, and as arm 24 swings from the position shown in full lines of Fig. 2, to the position illustrated in dotted lines thereof, dog 32 prevents a movement opposite to that said movement which tends to draw notch 20 toward hook 38 that is provided on the free end of arm 24. It is obvious from the showing in Fig. 2 that notch 20 and hook 38 are drawn closer together as arm 24 swings around pintle 26 in the direction of the arrows. When the parts are thus drawn together, the links adjacent one end of chain 10 are close to catch 14 and any one of the several links may be moved into position and held by this catch 14.

After this operation, dog 32 is released by pressing down on the engagable extended portion 40 and arm 24 is then free to swing back to a point where the distance between notch 20 and hook 38 will permit disengaging the ends of bar 16 and arm 24 from the links of chain 10.

The material from which this tool is made is preferably flat bar stock so that the room provided between automobile fender and the side of tire 6 will be ample to permit manipulating the tongs as desired.

Obviously, tire chain tongs having physical characteristics different from those illustrated in the drawing and described in this specification might be made without departing from the spirit of the invention or scope of the appended claim.

Having thus described the invention, what I claim as new and desire to secure by Letters Patent is:

A tire chain tool of the character described comprising a relatively long, flat bar having a handle at one end and a notch formed in one edge adjacent to the other end thereof, said notch being relatively narrow at its mouth and extended longitudinally of the bar between the longitudinal edges thereof to present an undercut portion on the bar at each end of the notch; an arm pivotally connected at its one end to the bar at a point spaced inwardly from the notch; a hook formed on the other end of the arm having the mouth thereof in opposed relation with the mouth of said notch; an arcuate face provided with ratchet teeth therein on one longitudinal edge of the arm, said face being concentric with the pivotal connection joining the bar and said arm; an L-shaped dog pivotally mounted on the bar at the zone of juncture of the legs of said L-shaped dog; a coil spring yieldably holding the free end of one of said legs against the arcuate face on the arm, said ratchet teeth being formed to allow rotation of the arm about the pivotal connection in one direction and to preclude rotation in the other direction, when the dog is in engagement therewith, the other leg of said dog being formed to present a finger engaging portion projecting laterally from the bar; a laterally projecting ear on the bar between said handle thereof and the point of connection between the dog and the bar, said ear having an opening therein for receiving one end of said spring; and a perforated projection on said other leg of the dog for receiving the opposite end of the spring through said perforation.

GEORGE H. SWEENEY.

REFERENCES CITED

The following references are of record in the file of this patent:

UNITED STATES PATENTS

| Number | Name | Date |
|---|---|---|
| 322,536 | Fuller | July 21, 1885 |
| 1,026,499 | Edgington | May 14, 1912 |